United States Patent [19]

Šandera et al.

[11] 4,004,944

[45] Jan. 25, 1977

[54] ELECTRODE MATERIAL FOR ACCUMULATORS AND OTHER ELECTROCHEMICAL SOURCES OF CURRENT

[75] Inventors: Josef Šandera; Milan Calábek; Miroslav Cenek, all of Brno; Vojtech Koudelka, Mlada Boleslav; Oldrich Kouřil, Brno; Jiri Malik, Mlada Boleslav; Josef Vaňáček, Brno, all of Czechoslovakia

[73] Assignee: Prazska akumulatorka, narodni podnik, Mlada Boleslav, Czechoslovakia

[22] Filed: July 28, 1975

[21] Appl. No.: 599,421

[30] Foreign Application Priority Data

July 30, 1975 Czechoslovakia .................. 5419/75

[52] U.S. Cl. .................................. 429/215; 429/217
[51] Int. Cl.² ......................................... H01M 35/02
[58] Field of Search ....................... 136/24, 26–31, 136/75, 120 R, 20

[56] References Cited

UNITED STATES PATENTS

| 1,988,861 | 1/1935 | Thorausch et al. | 136/29 |
| 2,738,375 | 3/1956 | Schlotter | 136/30 |
| 3,314,820 | 4/1967 | Smith | 136/24 |

Primary Examiner—Anthony Skapars

[57] ABSTRACT

An improved active electrode composition for a plastic-bonded electrode of an electrochemical accumulator is described. A powder of the principal electrode active material is mixed with 1.5 – 60% by weight of oxalic and/or a salt thereof. The admixture of such ingredients with a suitable binding agent may then be applied to an expanded metallic collector and then heat and pressure treated in a conventional manner to obtain the required electrode.

4 Claims, No Drawings

ELECTRODE MATERIAL FOR ACCUMULATORS AND OTHER ELECTROCHEMICAL SOURCES OF CURRENT

BACKGROUND OF THE INVENTION

The invention relates to compositions for a plastic-bonded or pocket-type cadmium, nickel or zinc electrode for an electrochemical source of current. The electrode composition is particularly suitable for electrodes useful in accumulators of the nickel-cadmium, silver-cadmium, nickel-zinc, silver-zinc, and zinc-air type.

Pocket-type electrodes for such applications are conventionally formed by applying an active electrode composition to a separate expanded or grid-like frame of a separate metal.

Such construction has been found to be relatively expensive and laborious to produce. Moreover, it has been found to have a relatively small degree of utilization of the electrode active material during its life cycle and a relatively large internal resistance vis-a-vis electrodes formed by conventional sintering processes. On the other hand, sintered electrodes for such applications generally cost nearly twice as much to produce as a pocket-type electrode of the same capacity.

SUMMARY OF THE INVENTION

The present invention provides an improved active electrode composition for a plastic-bonded electrode that exhibits a relatively high degree of active material utilization and a relatively low internal resistance compared to designs of the prior art.

In an illustrative species of the improved composition, a powder of a base electrode active material, illustratively cadmium, nickel, zinc or zinc oxide, is mixed with a binding agent and with oxalic acid and/or a salt thereof, the oxalic acid being present in the composition in the range of 1.5 – 60% by weight.

Similar advantageous results are obtained by employing in such composition, in place of oxalic acid, a substituted ingredient such as tartaric acid, succinic acid, malonic acid, acetic acid, and/or a salt of at least one of such acids. In each case, the proportion of such last-mentioned ingredient should be 1.5–60% by weight and preferably 20–25% by weight of the resulting composition.

DESCRIPTION OF IMPROVED COMPOSITION

The improved composition of the invention includes (a) a powdered active base material consisting of cadmium, nickel or zinc oxide, (b) a binding agent, and (c) an additive consisting of oxalic acid and/or a salt thereof. Such additive should be present in the solution in a range of 1.5–60% by weight.

In order to form a plastic-bonded electrode for an electrochemical source of current, an electrode material having the above-mentioned composition may be applied around an expanded metal collector and then simultaneously heat and pressure treated in a conventional manner. The resulting plastic-bonded electrode exhibits a degree of active material utilization which is larger than that of prior pocket-type electrodes, and yields an internal resistance which is the same as a pocket-type electrode or which approaches that of conventional sintered electrodes. At the same time, the manufacturing cost of the improced electrode is comparable to or less expensive than that of previous conventional pocket-type electrodes.

The following illustrative examples of the composition of the invention are herewith presented without limiting the generality of the foregoing.

A plurality of electrode compositions were formulated which included (1) a powder of the base electrode active material, (2) a polymeric dispersion employed as a binding agent, and (3) various acids (i.e. oxalic acid, tartaric acid, succinic acid, and malonic acid) and/or their salts, such ingredients (3) being present in the mixture in a proportion in the range of 1.5 – 60% by weight.

Of the compositions formulated, the following were particularly noteworthy:

a. Plastic-bonded cadmium electrodes having a current collector of ductile iron were manufactured using powdered cadmium base material, a binding agent of pulverized polyethelene and various oxalic acid contents as set forth in Table I below. During a succession of operating cycles each comprising 1.75 hours of charging and 1.25 hours of discharging at an identical current density of 12.3 mA/sp.cm, the attained capacities of each type of electrode were as follows:

TABLE I

| Electrode mixture composition | | | Capacity (Ah) reached at the end of | | | | | |
|---|---|---|---|---|---|---|---|---|
| conventional cadmium material | $H_2C_2O_4 \cdot 2H_2O$ | pulverized polyethylene | 5 | 89 | 90 cycles | 140 | 225 | 250 |
| 31 g | 1.67g, 5.11% | 6.2 g 5.0 | 5.3 | 5.3 | 5.1 | 4.5 | 4.3 |
| 31 g | 5.86g, 15.89% | 10.2 g 6.0 | 5.7 | 6.1 | 6.0 | 5.5 | 5.45 |
| 31 g | 14.78g, 32.2% | 12.5 g 7.1 | 5.9 | 6.6 | 6.5 | 6.6 | 6.6 |
| 31 g | 27.05g, 46.6% | 13.1 g 6.9 | 4.0 | 6.0 | 6.1 | 6.3 | 6.4 |

After the 89th cycle the electrolyte was changed.

b. Plastic-bonded zinc electrodes having a current collector of zinc-plated ductile iron were manufactured using zinc oxide base material, a binding agent of a polytetrafluorethylene suspension and oxalic acid as indicated in Table II below. During a succession of operating cycles comprising 1.75 hours of charging and 1.25 hours of discharging at an identical current density of 7.4 mA/sq.cm, the obtained capacities were as follows:

TABLE II

| Electrode mixture composition | | | | Capacity Ah reached at the end of | | | | | | |
|---|---|---|---|---|---|---|---|---|---|---|
| ZnO | $H_2C_2O_4 \cdot 2H_2O$ | | polytetrafluoroethylene suspension | 23 | 90 | 160 cycles | 190 | 227 | 260 | 354 |
| 32 g | 48 g | 60% | 9.0 g | 8.5 | 7.0 | 5.2 | 9.0 | 5.4 | 4.0 | 1.8 |

After the 180th cycle the electrolyte was changed.

Each of the resulting compositions was measured in a conventional accumulator environment having a commercial, complementary nickel electrode and an alkali electrolyte. Additionally, the resulting accumulators were found to have a much lower internal resistance using the electrodes formulated in accordance with the invention than with similar pocket-type electrodes made by prior-art techniques.

What is claimed is:

1. An improved active composition of a completed plastic-bonded electrode in an electrochemical current source, the composition consisting essentially of (1) a powdered base active material selected from the group consisting of cadmium, nickel, zinc and zinc oxide, (2) a binding agent, and (3) a substance selected from the group consisting of oxalic acid and a salt thereof, the last-mentioned substance being present in the composition in the range of 1.5–60% by weight.

2. A composition as defined in claim 1, in which the base active material is cadmium.

3. A composition as defined in claim 1, in which the base active material is zinc oxide.

4. A composition as defined in claim 1, in which the binding agent is pulverized polyethelene.

* * * * *